United States Patent

Bolash et al.

[11] Patent Number: 5,970,220
[45] Date of Patent: Oct. 19, 1999

[54] PRINTER HAVING UNIVERSAL IMAGE PORT AND RELATED SYSTEM AND METHOD

[75] Inventors: John Philip Bolash; Thomas Jon Eade; Michael David Gonzalez-Rubio; Matthew Kevan Zimmer, all of Lexington, Ky.

[73] Assignee: Lexmark International, Inc., Lexington, Ky.

[21] Appl. No.: 08/950,547

[22] Filed: Oct. 15, 1997

[51] Int. Cl.[6] ........................................ B41J 2/04
[52] U.S. Cl. .................. 395/114; 395/115; 395/116; 395/117; 395/112; 395/106; 395/101; 395/109
[58] Field of Search .................... 395/114, 115, 395/116, 117, 112, 106, 101, 109; 710/62, 72–74

[56] References Cited

U.S. PATENT DOCUMENTS

| | | | |
|---|---|---|---|
| 5,150,456 | 9/1992 | Wu et al. | 395/114 |
| 5,235,680 | 8/1993 | Bijnagte | 395/161 |
| 5,341,174 | 8/1994 | Xue et al. | 348/576 |
| 5,666,495 | 9/1997 | Yeh | 395/281 |
| 5,736,997 | 4/1998 | Bolash et al. | 347/19 |
| 5,758,037 | 5/1998 | Schroeder | 395/106 |
| 5,764,378 | 6/1998 | Oda et al. | 358/448 |
| 5,784,581 | 7/1998 | Hannah | 395/290 |
| 5,859,652 | 1/1999 | Silverbrook . | |

OTHER PUBLICATIONS

Jantz, "Speed Up Your CD–ROMs", PC World, Apr. 1997.

*Primary Examiner*—David K. Moore
*Assistant Examiner*—Lance W. Sealey
*Attorney, Agent, or Firm*—John J. McArdle

[57] ABSTRACT

A video frame imaging system for processing image data, including video frame data, and for printing images corresponding to print image data, comprising a computer having a processor for receiving and processing video frame data and for generating print image data and having a computer port connector, an arbitration control circuit, and a grab printer. The grab printer includes an integrated video capture unit for creating video frame data from a video input, a printer unit for printing images corresponding to print image data, and a grab printer port connector. The computer port connector and the grab printer port connector are coupled together and responsive to the arbitration control circuit to transfer video frame data created by the video capture unit between the video capture unit and the computer for processing by the computer in a first mode of operation. The computer port connector and the grab printer port connector are responsive to the arbitration control circuit to transfer print image data between the computer and the printer unit for printing images using the printer unit in a second mode of operation.

18 Claims, 5 Drawing Sheets

PRINTER HAVING UNIVERSAL IMAGE PORT AND RELATED SYSTEM AND METHOD

BACKGROUND OF THE INVENTION

1. Field of the Invention

The present invention relates to an apparatus and method for use in video frame imaging; more specifically, the present invention is directed to a printer and related system and method having video image capture capabilities and allowing controlled video frame and print image data transfer between the printer and a personal computer ("PC") through a data port.

2. Description of Related Art

A conventional video frame imaging system includes a video capture device ("VCD") for capturing single frame video images from any device capable of producing and making available for capture composite video data. Composite video data for capture by a VCD is obtainable from various devices, including, for example, digital cameras, televisions ("TVs"), video cassette recorders ("VCRs"), and video camera/recorders ("camcorders"). A VCD typically is implemented in a frame imaging system using one of two basic strategies, and typically the VCD, regardless of implementation strategy, comprises certain basic operational components.

In one conventional implementation the VCD takes the form of a printed circuit card assembly that is installed by plug-in connection as an optional enhancement for a PC. In such a case, the VCD is plugged in under the housing of the PC's control unit or main hardware box and CPU, and is thereby connected to the PC bus to enable electronic interface with the PC.

Such a VCD implementation presents the user with several challenges. Installation of the VCD requires the user to remove the housing of the control unit and access the installation site. The user must select the appropriate place for VCD installation, and also must reconfigure the PC to accommodate the newly installed VCD. These tasks may be particularly daunting for the "average" PC user.

Alternatively, conventional implementation of a VCD in a frame imaging system may involve use of an external VCD unit that is connected to a PC through a parallel port, which usually is located in the rear of the PC and conventionally reserved for enabling a printer connection to the PC. Accordingly, this VCD implementation presents a problem when use is sought of both the external VCD and a printer. Since printer usage requires connection of the printer through the parallel port, the user is forced to choose between arranging the PC for use with the VCD or with the printer (i.e., with only one of these "peripheral devices"). And the user must connect and disconnect the peripheral devices every time a new selection of a peripheral device is made.

The conventional solution to the choice-of-peripheral device problem involves the installation of a multi-line peripheral device switch interposed between the peripherals and the PC. A switch of this type enables ready selection of and (re)connection of the desired peripheral to the PC. However, use of such a switch itself introduces problems. Such switches may be of low quality, and may in certain instances introduce undesirable noise in the signals conducted therethrough, causing intermittent and untimely function problems for the printer, or for the VCD. Moreover, the use of even a theoretically perfect multi-line peripheral device switch involves additional operating complexity and expense of the kind the typical PC user wishes to avoid, and generally comprises a solution lacking in operational elegance.

Referring to FIG. 1 (prior art), a typical video frame imaging system 12 is shown with an externally operating VCD 10. Video frame imaging system 12 also includes a computer 14, a printer 16, and a multi-line peripheral device switch 18.

VCD 10 includes analog-to-digital ("A/D") converter 22, video capture control circuit 24, video field frame memory 26, and parallel port connector (or "parallel port") 28. Composite video data, being transferred over a line 20 from, for example, a camcorder (not shown), is received by VCD 10 via a standard "RCA" connector or "jack" (i.e., a pin and shell type connector) and inputted to analog to digital ("A/D") converter 22. The received composite video data may, for example, be in standard NTSC (National Television Systems Committee) format or PAL (Phase Alternating Line) format. The received composite video data is sampled and digitized by A/D converter 22. The composite video data includes luminance and chrominance information used in generating a frame image. The output of A/D converter 22 is coupled to the input of video capture control circuit 24. Video capture control circuit 24 operates to, among other things, access the digitized composite video data from A/D converter 22 and transfer it to video field frame memory 26 to which video capture control circuit 24 is in operative electrical connection. Video capture control circuit 24 also is operatively connected to parallel port connector (or "parallel port") 28 through which connection is made by VCD 10 to switch 18.

Switch 18 makes possible operative electrical connection between either VCD 10 and computer 14, or printer 16 and computer 14. For example, in FIG. 1, switch 18 is connected to parallel port connector (or "parallel port") 28 of VCD 10 and to parallel port connector (or "parallel port") 32 of computer 14. Thus, digitized composite video data may be transferred by switch 18 from VCD 10 to computer 14 through parallel port connecter 32 of computer 14. The printer is not electrically connected to the computer 14 in this example. To connect the printer, one would move the switch from position "A" to position "B".

Computer 14, which may be a PC, includes in memory (not shown) port I/O driver software 34, video capture software 36, other graphics application software 38 and printer driver software 40. I/O driver software 34 allows computer 14 to operatively interface with connector 32 to handle data transfer to and from port 32. Software 34 also can be used by computer 14 to handle receipt of digitized video data, and to prepare the digitized video data for storage and processing by computer 14. The prepared digitized video data then can be processed, as is known to those skilled in the art, by conventional video capture software 36. Computer 14 uses software 36 to convert the digitized video data for display on a video monitor (not shown) of computer 14 using a standard format such as, for example, a "640×480 pel VGA" format. Typically, software 36 also allows the user to adjust parameters such as brightness, hue, sharpness, etc., and implements the saving of files of the resultant video data in typical 24-bit RGB color graphic file formats (e.g., TIFF (Tagged Image File Format), BMP (Bit Map), and JPEG (Joint Photographic Exports Group)). These files can then be used by graphic application software 38 that is loaded on computer 14 and interfaces with the other resident software. Driver software 34 and capture software 36 are able to interface for data transfer and for operation.

Graphics application software 38 uses the video files to manipulate print files that are used to generate printed images of the video images contained in the files using printer driver software 40. Alternatively, video data files may be communicated directly (without further manipulation/enhancement) from video capture software 36 to printer driver software 40 for the purpose of creating print images.

Printer driver software 40 generates the print image signals or data used in directing printer 16 to produce images corresponding to the desired video images. However, in this conventional system, transferring print signals to printer 16 and printing the images using printer 16 is not possible until switch 18, which necessarily would have been set to permit transfer of the video frame data from VCD 10 to computer 14, has been manually (re)adjusted to allow transfer of print image data between computer 14 and printer 16.

The present invention not only totally avoids the problems associated with manually installing a VCD card into a PC or other computer (when that approach is selected), the present invention also completely avoids the operational inadequacies associated with using a computer, a separate VCD, and a separate printer in conjunction with one another.

SUMMARY OF THE INVENTION

The present invention represents a holistic, integrated approach for implementing a video frame imaging system that includes a printer. Specifically, the video frame imaging system of the present invention comprises a host computer (e.g., a PC), and an enhanced or "grab" printer particularly incorporating the teachings of the present invention.

The host computer includes, among other components, a parallel port connector for interfacing with the grab printer; the grab printer comprises two primary internal operating units: a printer unit; and a frame grabber or video capture unit ("VCU"). The grab printer also includes a parallel port connector for interfacing the grab printer's video capture and printer units with the computer. Both the computer and the grab printer include a controller for arbitrating use and control of the parallel port connectors by the VCU, during a video mode, and by the printer unit, during print mode operation.

More specifically, the invention comprises a printer with a composite video input port, a parallel port connector, a video capture circuit, a print element driver circuit and a printer control logic circuit. The video capture circuit is coupled between the composite video input port and parallel port connector and the printer control logic circuit is coupled between the print element driver circuit and the parallel port connector.

The present invention also comprises a video frame imaging system for processing video frame data and for printing images corresponding to print image data. The frame imaging system includes a computer having a processor for receiving and processing video frame data and for generating print image data and having a computer port connector. The system also includes an arbitration control circuit, and a grab printer, housed in a cabinet separate from the computer, with an integrated video capture unit for creating video frame data from a video input, a printer unit for printing images corresponding to print image data, and a grab printer port connector. In the imaging system the computer port connector and the grab printer port connector are coupled together and responsive to the arbitration control circuit to transfer video frame data created by the video capture unit between the video capture unit and the computer for processing by the computer in a first mode of operation, i.e., the video mode. Also, in the imaging system, the computer port connector and the grab printer port connector are responsive to the arbitration control circuit to transfer print image data between the computer and the printer unit for printing images using the printer unit in a second mode of operation, i.e., the print mode.

With regard to more specific functional blocks, the printer unit of the grab printer (to be described more particularly hereinafter) includes a printer electronics package comprising an application-specific integrated circuit ("ASIC"), a unit selection circuit, a memory, a microprocessor, driver circuits for the printer motor and a print element on a carrier. The grab printer's VCU comprises an A/D converter, a video frame capture control chip, and a video frame memory.

In addition to having a parallel port connector, the computer comprises port I/O driver software, video capture software, and printer driver software, which cooperate to support video frame imaging and printing functions. It may also comprise graphics application software.

The VCU of the grab printer and the computer also may comprise additional universal serial bus ("USB") components to process serial image data from devices that output data in USB format rather than composite video data received via an RCA-type connector to a parallel port (devices such as scanners and some digital cameras). Such components include, as part of the VCU, a USB data receipt port connector, a USB controller circuit, and a USB data transmission port connector. The USB components also include, as part of the computer, a USB port connector and USB device application software and port I/O driver software.

Integration of the VCU and the printer unit in the grab printer of the present invention, and provision of means for arbitrating use and control of the parallel port connectors of the frame imaging system creates operational conditions under which much more convenient, joint and coordinated use can be made of video frame capture and printing capabilities. This arrangement eliminates the need for installation of a VCU card in the host computer, and for the use of a peripheral device switch, with its attendant problems. The system of the present invention enables a user, merely by combining the novel printer and a computer, to perform video frame processing and other imaging that cooperatively can utilize the full range of display options available using the computer's display monitor, and the full range of print options available using state of the art printing capabilities.

From the foregoing description, it will be understood by those of ordinary skill that the present invention also is directed to a method for video frame imaging and printing, with a grab printer having an integrated video capture unit, a printer unit and a grab printer port connector operatively connected to the video capture unit and the printer unit, and an arbitration control circuit. The method comprises the steps of: creating video frame data from a video input; providing control of the grab printer port connector to the video capture unit to make video frame data transferable between the integrated video capture unit and the grab printer port connector during a first mode of operation, and providing control of the grab printer port connector to the printer unit to make print image data transferable to the grab printer parallel port connector from a print image data input and between the grab printer port connector and the printer unit during a second mode of operation.

DETAILED DESCRIPTION OF THE PREFERRED EMBODIMENT

Figure 1:
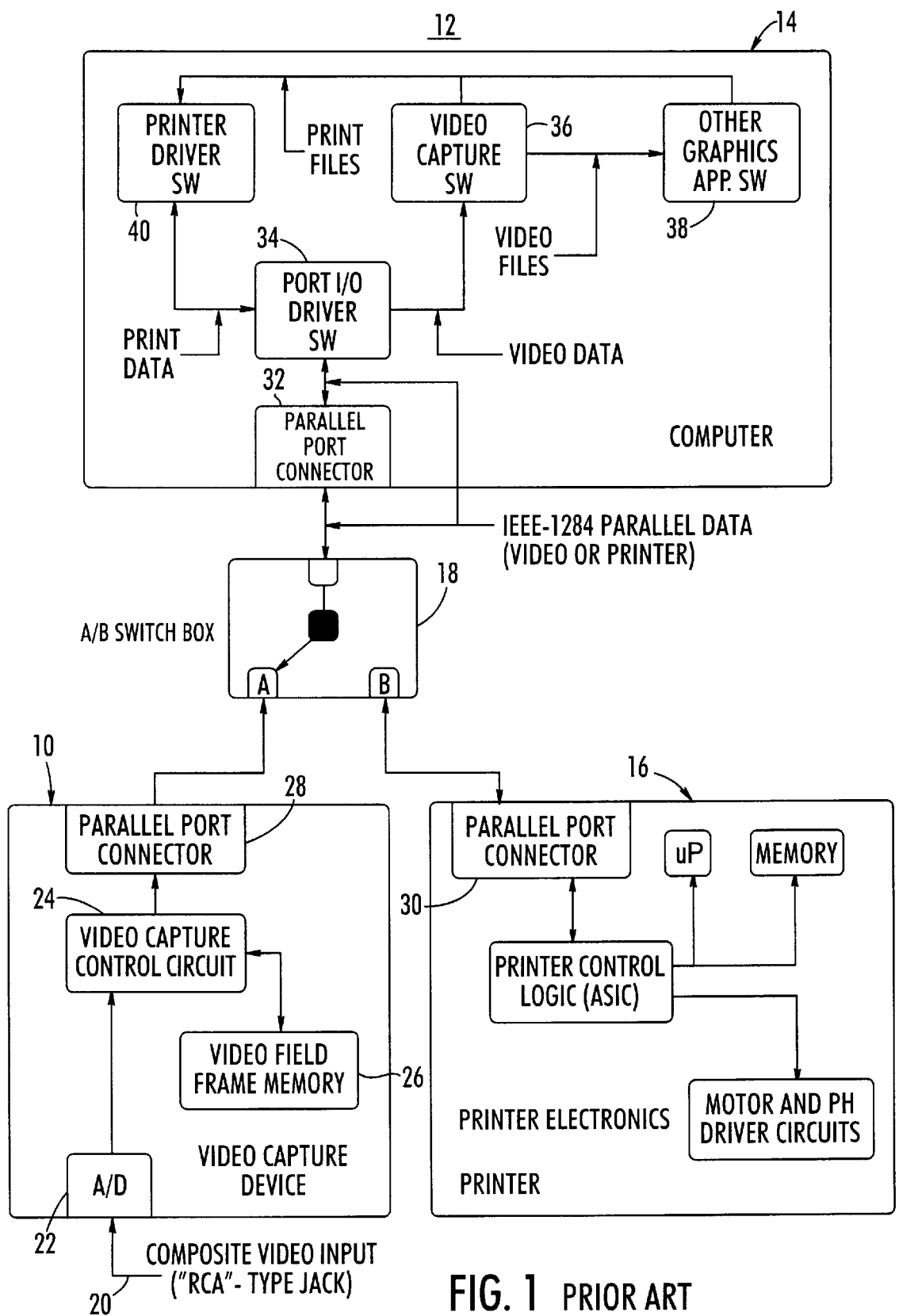
FIG. 1 is a block diagram showing a prior art configuration of a video frame imaging system including a stand alone video capture device, a host personal computer and a separate printer.
Figure 2:
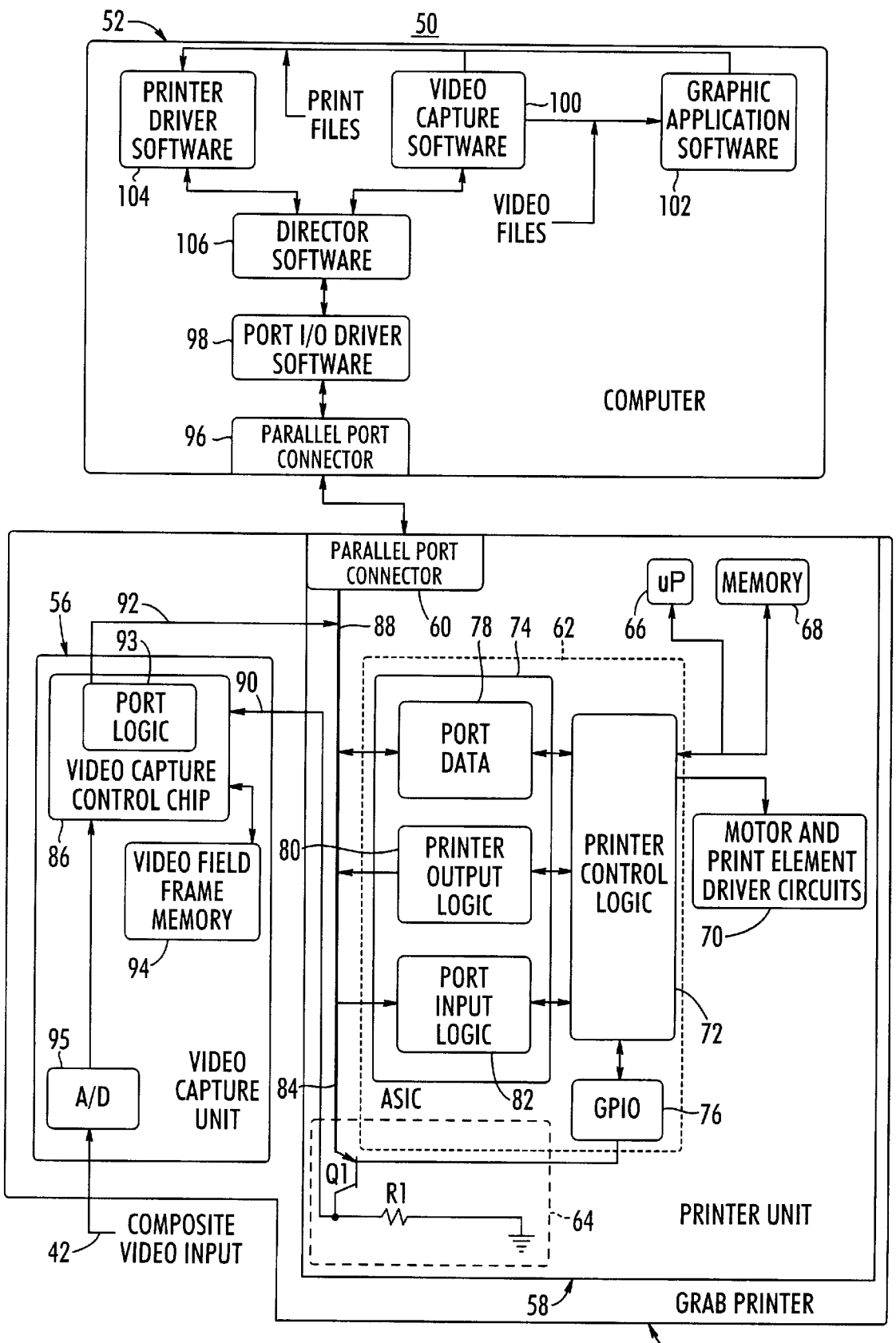
FIG. 2 is a block diagram showing a configuration of a frame imaging system incorporating the teachings of the present invention and including a host personal computer and a grab printer with video frame grabbing capability.

A preferred embodiment of a video frame imaging system, incorporating the teachings of the present invention is herein described. Referring to FIG. 2, a video frame imaging system 50 is shown as comprising a host computer 52 and a grab printer 54, each housed in a separate cabinet.

In the preferred embodiment described herein, grab printer 54 includes a video capture unit ("VCU") 56, a printer unit 58, and a parallel port connector (or "parallel port") 60 used in the transfer of data between computer 52 and either VCU 56 or printer 58.

The description provided herein should be approached with the understanding that, in a first mode of operation, "video mode," VCU 56 is operational and has access of parallel port 60 to accomplish the transfer of video frame data between VCU 56 and computer 52. The system also should be understood, in a second mode of operation, "print mode", to render printer unit 58 operational with access of port 60 to accomplish the transfer of print image signals from computer 52 to printer unit 58 to accomplish printing of images using printer unit 58. The various subcomponents described below facilitate video mode and print mode operation and arbitration of port 60 for operation in either of these modes. In the illustrated form, the printer unit 58 comprises an ink jet printer unit.

Printer unit 58 comprises an ASIC 62 for controlling print mode operation, and a selection circuit 64 for disabling video mode operation of VCU 56 at the appropriate time in response to a signal from ASIC 62.

In the preferred embodiment, printer unit 58 also includes a microprocessor 66, a memory 68, and motor and print element driver circuits 70, which are in operative electrical communication with ASIC 62 to transfer to and receive from ASIC 62 control signals and/or print image data, as appropriate. Memory 68 stores image data and control information. Microprocessor 66 operates using the data from memory 68 to generate control signals that direct ASIC 62 to effectuate the operation of motor and print element driver circuits 70.

More specifically, ASIC 62 preferably comprises various components for use in controlling and executing print mode operation and for use, under control of computer 52, in deactivating print mode and activating video mode, as required. ASIC 62 includes a printer control logic block 72, a port control logic block 74, and a general purpose input/output ("GPIO") block 76. Printer control logic block 72 performs core printer unit control functions associated with use of microprocessor 66 and memory 68 to generate print images by effectuating operation of driver circuits 70.

Printer control logic 72 also operates to send and receive signals to and from port control logic 74 and GPIO 76, with which logic 72 is in operative electrical communication, to achieve coordinated operation of VCU 56 and printer unit 58 with port connector 60, as described below.

Preferably, port control logic 74 contains three functional units: port data sub-block 78, port output logic sub-block 80, and port input logic sub-block 82. Port data sub-block 78 comprises signal lines for transferring print image and control data communicated through port 60. Port output logic block 80 comprises signal lines for, among other things, transferring to computer 52 port control signals. Port input logic block 82 comprises signal lines for receiving from computer 52 port control signals.

In the preferred embodiment, GPIO block 76 comprises general purpose pins for use in sending and receiving control signals generated or used by ASIC 62 as it operates under the control of resident printer firmware. In a preferred embodiment of the present invention, GPIO block 76 is responsive to a multi-byte escape sequence which is received as standard IEEE-1284 8 bit data by port data block 78 from computer 52 through port 60, which initiates video mode, enabling access to port 60 by VCU 56, allowing data communication to flow between VCU 56 and computer 52. Once video mode is initiated by the escape sequence, GPIO block 76 is responsive to IEEE-1284 control line _SELECTIN received by port input logic block 82 and goes to a LOW logic state (it was driven HIGH after receipt of the escape sequence) to disable access to port 60 by VCU 56 and disable data communication between VCU 56 and computer 52. In the preferred embodiment, as shown in FIG. 2, there is a selection circuit 64 which is responsive to GPIO block 76 to enable or disable access of VCU 56 to port 60. Selection circuit 64 comprises transistor switch Q1 and resistor R1. One side of the transistor switch (collector) Q1 is connected to resistor R1 and to ENABLE line input 90 of VCU 56. The other side of transistor switch Q1 (emitter) is connected to IEEE-1284 DATA LINE 3 84 which is taken from the IEEE-1284 control and data line bus 88. The control electrode of transistor switch Q1 is connected to an output of GPIO 76.

To disable VCU 56, GPIO 76 turns off transistor switch Q1 in response to control line _SELECTIN changing to a LOW logic state. When transistor switch Q1 is off, resistor R1 holds VCU 56 ENABLE line input 90 at ground (LOW logic state) which disables VCU 56. When disabled, VCU connections to the parallel port 60 are in a "HIGH Z" (high impendance or tri-state) mode.

Referring still to FIG. 2, video capture control chip 86 of VCU 56 includes a port logic block 93 that regulates frame data transfer in accordance with the existing arbitrated mode of port 60 (i.e., whether VCU 56 or printer unit 54 has access thereof). Specifically, port logic block 93 operates such that it effects data transfer only when ENABLE line 90 is in a high logic state.

VCU 56 further comprises a video field frame memory 94, for storing digitized composite video frame data for transfer to computer 52 (when allowed), and an A/D converter 95 for receiving analog composite video data (to be digitized) over an input 42. Input line 42 receives composite video input from an external source (not shown) and may be connected to VCU 56 by a standard "RCA" type jack.

Computer 52 includes its own parallel port connector ("parallel port") 96 for use in transferring signals between computer 52 and grab printer 54. Computer 52 also comprises port I/O driver software 98, operatively interfacing with port 96 to select and prepare control signals and data for transfer between computer 52 and grab printer 54 using the channel provided by ports 96 and 60.

Computer 52 also specifically comprises software to support video frame imaging and printing. Preferably, computer 52 includes installed video capture application software 100 for processing digitized video data from VCU 56. Software 100 "post-processes" the digitized video data for display on a video monitor (not shown) of computer 52, using, for example, a 640×480 pel VGA format. Software 100 allows adjustment of various parameters, and implements video file storage in appropriate formats. Video data files from software 100 may be transferred to graphic application software 102 as video files or to print driver software 104 as print files. Graphic application software 102 is usable to manipulate video data files of captured frames to generate various print images; or print images may be generated by software 104 using video data files which have not been further processed by graphic application software 102.

An additional software block, which may be included in computer 52 is a director software 106 interposed between printer driver software 104 and port I/O driver software 98, and between video capture software 100 and port I/O driver software 98. Director software 106 may function, for example, in either a Windows 3.1 operating system environment or Windows '95 operating system environment. Director software 106 determines, by polling driver software 98, whether VCU 56 or printer unit 58 has access of port 60, and ensures that only printer driver software 104 is transferring data to driver software 98 when printer unit 58 has access of port 60 (in print mode), and that only video capture software 100 is receiving data from driver software 98 when VCU 56 has access of port 60 (in video mode).

Specifically, director software 106 simply could operate as printer status window control software. As such, the software simply regulates by ensuring that only one unit is using the parallel port. For example, if receipt of frame image data is sought during printing, software 106 can generate an error message for the PC monitor, indicating that access is by the printer unit and that VCU access will not be allowed until the printing job is complete. In this case, the status window software and port status check may be implemented as software within the printer driver software 104 and the video capture software 100, instead of as a unique block of director software 106. In this case, software 100 and 106 independently check whether the port 96 and port I/O software 98 are in use before trying to take control of the port.

Figure 3:
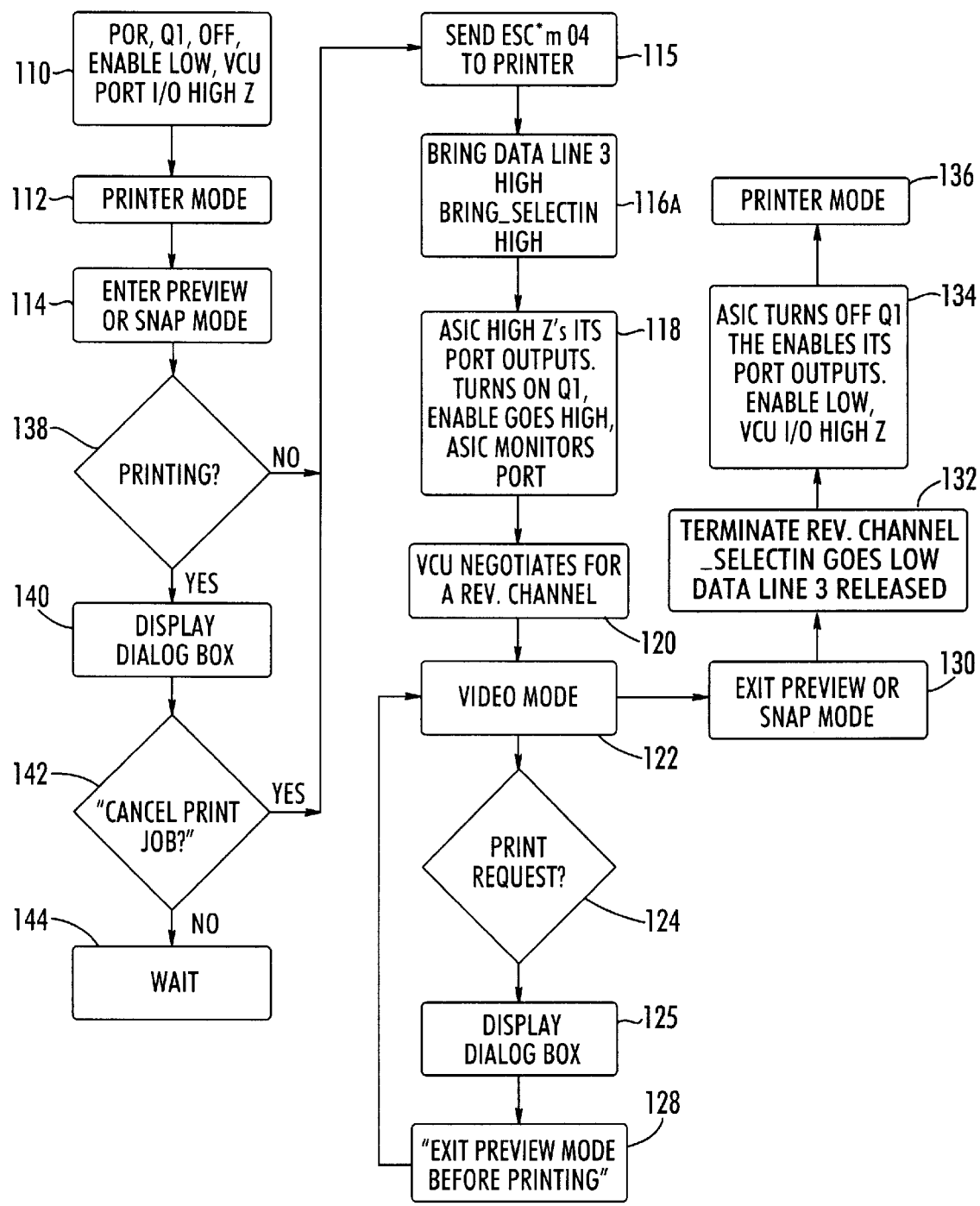
FIG. 3 is a flow chart showing the manner in which peripheral device access and control of the parallel port of the grab printer of FIG. 2 is regulated.

Having described the components of the computer, and the grab printer's VCU and printer unit, which altogether make up a video frame imaging system according to the present invention, and having described the operative interconnection of these devices, generally, as would be understood by those of skill in the art, the operation of the imaging system is now more specifically described referring to the flowchart of FIG. 3.

In step 110 of the operation of programmed microprocessor 66 (FIG. 2), transistor Q1 is held OFF (under direction of GPIO 76 of ASIC 62) upon power on/reset ("POR") of grab printer 58. With transistor Q1 in the OFF state, resistor R1 (see FIG. 2), tied at one end to ground, holds ENABLE line input 90 in a logic low state, which forces all the parallel port I/O lines 92 of VCU 56 into a HIGH Z state, leaving access and control of port 60 to printer unit ASIC 62. The parallel port I/O lines to printer unit 58 not being in a HIGH Z state, are enabled to communicate through port 60, thus placing grab printer 58 in print mode, and making it capable of carrying out full (ink jet) printer operation, as depicted by step 112. A transition from print mode to video mode is accomplished by entry of the imaging system into a preview mode or snap (or single video frame grab) mode (step 114), for example, at user direction. Preview mode may be initiated when video capture software 100 is activated on computer 52. In this mode, captured video frames, obtained through VCU 56 (which have been stored), may be viewed on the video display monitor (not shown) of computer 52 (step 114, following the non-print preview mode sequence). Illustrative of computer capabilities, the frames may be viewed at a rate of two frames every second. Snap mode is similar to preview mode in all respects except that in this mode, a single image is captured and sent to computer 52. Preview or snap mode use of video frame data indicates the computer user's concern with video frame imaging capabilities, and thus is relied upon to prompt video capture software 100 to generate a multi-byte "escape sequence" of control signals for transmission by port I/O driver software 98 through ports 96 and 60 to ASIC 62 (step 116). The escape sequence signals are received as data by ASIC 62 through port data input logic block 78. (The escape sequence employed in a preferred embodiment is coded as ESC* M O 4 in ASCII, and "1B-2A-6D-00-34" in hexadecimal.) After receipt of the escape sequence by ASIC 62, the video capture software brings IEEE-1284 lines, _SELECTIN, DATA LINE 3, to a HIGH logic state (step 116A).

In response to the receipt of the escape sequence signals, ASIC 62 drives signal lines of port output logic 80 (reserved for output of control signals to printer 52) to a HIGH Z state, and turns ON transistor Q1 using GPIO 76 (step 118). Turning on transistor Q1 electrically connects DATA LINE 3 84 of the IEEE-1284 port bus 88 to ENABLE line 90. When DATA LINE 3 84 is driven HIGH by video capture software 100 (step 116A), video capture control chip 86 is enabled and frees lines 92 from a HIGH Z state, and the video capture control chip 86 negotiates an IEEE-1284 reverse channel to enable transmission of video data over port lines 92, through parallel port 60. Although signal lines of port output logic sub-block 80 are forced into HIGH Z state (i.e., disabled) in step 118, port data signal lines of sub-block 78 and port input logic sub-block 82 are not forced into HIGH Z state in response to the receipt by ASIC 62 of escape sequence signals. Accordingly, while VCU 56 is enabled, although ASIC 62 of printer unit 58 cannot send control signals necessary to gain access of port 60, ASIC 62 can and does continue to monitor and to parse/interpret port input logic signals (received through sub-block 82) and port data signals (received through sub-block 78). That is, ASIC 62 continues to monitor and parse/interpret all control and data information appearing in standard IEEE-1284 format passing from port 60, including control signals intended for ASIC 62. This monitoring and parsing/interpreting activity permits ASIC 62 to determine when a mode change is being indicated, and allows ASIC 62 to re-enable signal lines of port output logic sub-block 80 for (re)capturing port 60, when appropriate.

As stated, turning transistor Q1 ON, results in control lines 84 and 90, being connected together and, once driven high, to prompt VCU 56 to negotiate for a pathway for data transmission "back" from VCU 56 through ports 60 and 96 to computer 52 (step 120). Such a channel may be, for example, a "reverse channel" of the type provided when operating under a protocol that complies with IEEE-1284 formats. Data sent to computer 52 over such a channel may conform to IEEE-1284 (four-bit) nibble mode transmission.

Once a reverse channel exists for transmission of video frame data from VCU 56 to computer 52 through ports 60 and 96, imaging system 50 transitions to video mode (step 122). Transition to video mode results in director software 106 determining (from interfacing with driver software 98) that VCU 56 has access of port 60 and not allowing printer driver software to access port I/O driver software 98 until a subsequent mode change. In video mode, video capture software 100 can request VCU 56 to capture and save in memory of computer 52 (not shown) a frame of video data. That data is captured and digitized (by A/D converter 95) and stored (memory 94) in digitized form by VCU 56. While in video mode, frame imaging system 50, among other things, awaits a print request (step 124).

Illustratively, any print request, occurring while system 50 is operating in a Windows operating system environment and in video mode, are handled by printer driver software 104. Printer driver software 104 will be notified by director software 106, or checks I/O driver software 98 status directly, that port 60 is available to VCU 56 and not to printer unit 58. This notice is provided by director software 106 when a print request is received from software 104 by polling port I/O driver software 98 to verify that video frame data is being received (or is receivable) from VCU 56 and that driver software 104 may not yet pass on print image data from print driver software 104. Alternatively, software 104 may check I/O driver software 98 status directly.

The fact that I/O driver software 98 is in video mode causes printer driver software 104 to display on the video monitor (not shown) of computer 52 a dialogue box (step 126), which states that port 60 is in use and not available (step 128). To print, the user must exit preview or snap mode (step 130), which mode prompted and resulted in the enablement of video mode operation (step 114). Even in the absence of a print request, preview mode or snap mode exit (step 130) can be achieved based on a direct prompt for such a step as permitted by video capture software 100.

Preview or snap mode exit (step 130) involves execution of a simplified termination phase sequence by video capture software 100. Alternatively, this sequence may be executed in compliance with IEEE-1284 standards. Termination phase sequence signals are transmitted under direction of software 100 and port I/O driver software 98, which have not yet granted printer driver software 104 the opportunity to transfer print image data. In this configuration, the termination sequence brings IEEE-1284 control line __SELECTIN to a low logic state, which is connected via the IEEE-1284 bus 88 to port input logic sub-block 82 being monitored by ASIC 62. Additionally, software 100 releases DATA LINE 3 84 for normal forward data transfer (step 132). ASIC 62 interprets a low __SELECTIN line as a direction to turn OFF Q1 using GPIO 76, forcing enable line 90 into a LOW logic state, which disables VCU 56, putting all VCU port I/O lines, lines 92, in a HIGH Z state (step 134).

The foregoing activities, comprising steps 132 and 134, (re)establish print mode (step 136) by putting ports 60, 96 in forward transfer mode. Print images are then created using driver circuits 70 under control of logic signals from printer control logic block 72. These signals result from the generation of print image data by software 104 transferred through port 96 and through sub-block 78. Forcing a low __SELECTIN signal into port input block 82, as described above, is associated with IEEE-1284 "compatibility mode," while a high __SELECTIN signal on line 84 would be associated with one of a plurality of other IEEE-1284 modes.

In IEEE-1284 compatibility mode, ASIC 62 negotiates to obtain an IEEE forward channel over which print data would be forwarded by computer 52 to printer unit 58 through data lines of port data sub-block 78.

Also, in the period before system 50 transitions from preview or snap mode entry (114) to actually sending the escape sequence which includes video monitor display of captured frames (116), video software 100 will detect any attempt to initiate printing (step 138). The absence of any such attempt allows software 100 to send the escape sequence and enter video mode. Alternatively, an attempt to initiate preview or snap mode in software 100 when a print job is in progress will result in the user of the computer 52 having the opportunity to respond to a dialogue box displayed by software 100 (step 140), providing the option to cancel the print job or hold it in abeyance until print mode has been (re)established (step 142, 144). Cancellation of the print job by the user enables sending the escape sequence (step 116) and all that follows to enter video mode. A decision by the user not to cancel the print job results in a wait for the user until the print job is completed.

Video mode can be re-established by entering preview mode (114) and progressing through steps 116, 116A, 118 and 120. Preferably, whenever preview mode is exited (130), steps 132 and 134 will be executed to re-establish print mode. As one of ordinary skill will readily appreciate, the foregoing description of the steps of operating system 50 is illustrative and not limiting. Modifications not inconsistent with the present invention may be made. For example, the use of dialogue boxes (steps 140 and 142, and 126 and 128) is not required. Director software 106 can be written to ensure that the user exits preview or snap mode to complete print jobs whenever a print job request is interposed, instead of inserting these lines of code in driver software 104 and video software 100.

As the foregoing description demonstrates, the present invention allows for an elegant, coordinated transition between use of the VCU of the imaging system and the printer of the imaging system. In fact, quick real-time coordinated arbitration of the use of port 60 in the manner described also opens the door for ready use of video frame data to create print images under control of the resident software of computer 52.

Figure 4:
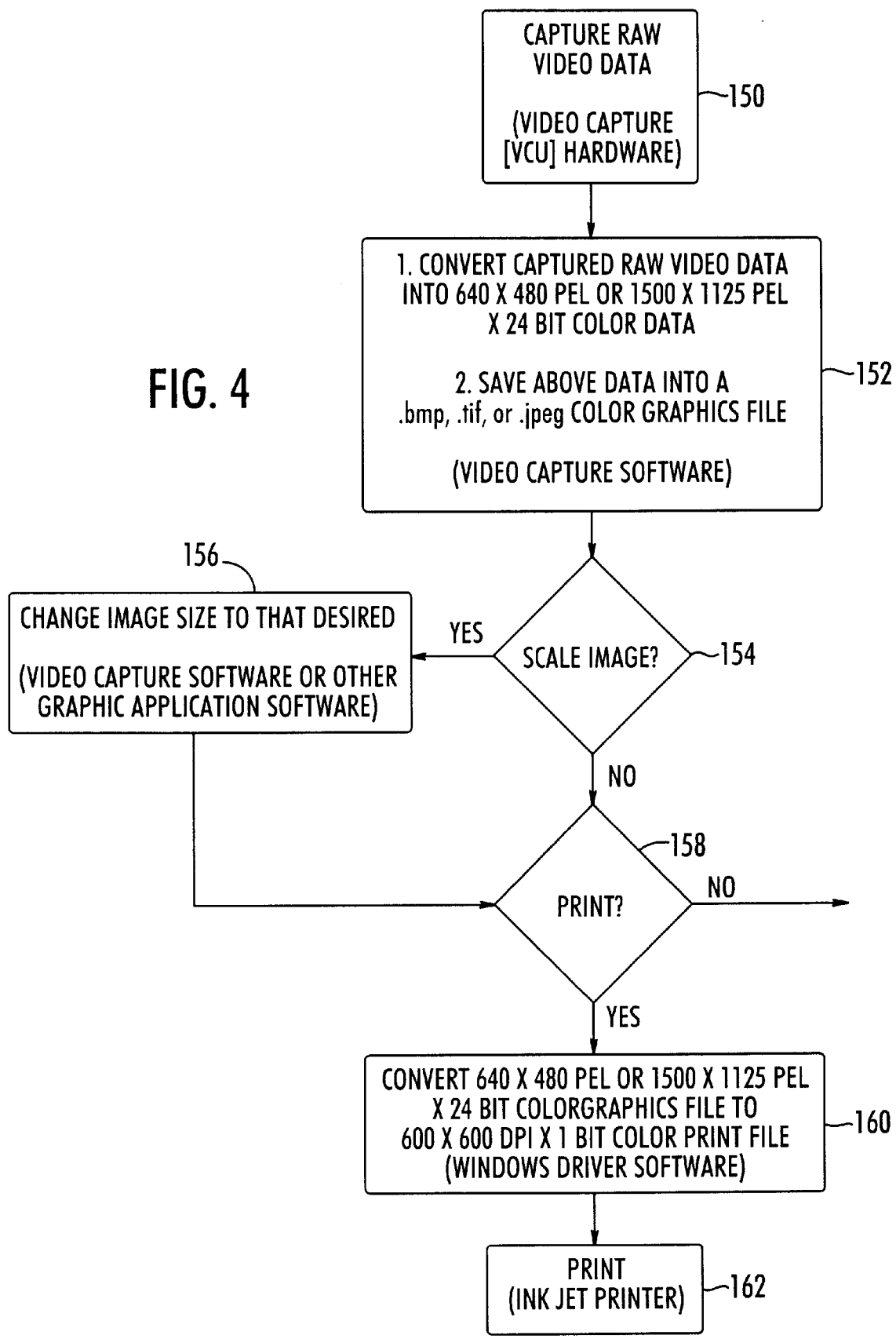
FIG. 4 is a flow chart showing a video frame capture imaging sequence according to the teachings of the present invention.

Referring to FIG. 4, use of video frame data captured by VCU 56 to create print images is illustratively described. The text in parentheses in the boxes of FIG. 4 indicates which software or hardware is performing the referenced task shown in the box.

When a frame of video data is captured by VCU 56 (step 150), it is converted, for example, to 640×480 pel or 1500×1125 pel by 24 bit RGB (Red/Green/Blue) color data using video capture software 100, and stored in common graphic file formats using video capture software 100 for further processing (step 152). Video capture software 100 or graphic application software 102 can scale an image captured by the file of video data to any preferred allowed dimension if the user so desires (step 156). An image, whether scaled or not, may then be chosen for printing by the user (step 158).

Printing a video frame in, for example, the Windows environment with (Windows) printer driver software 104 involves conversion of the 640×480 pel or 1500×1125 pel by 24 bit color data in the file into, for example, 1 bit×600×600 dots per inch CMY (Cyan/Magenta/Yellow) print data (step 160) that can be printed by a color ink jet printer implementation of printer unit 58 of grab printer 54 (step 162).

The color format is CMY as an example but may be other color formats such as CMY+K (Cyan/Magenta/Yellow/Black) or hexcolor formats like CMY+Kcm (Cyan/Magenta/Yellow/Black/dilute Cyan/dilute Magenta).

Figure 5:
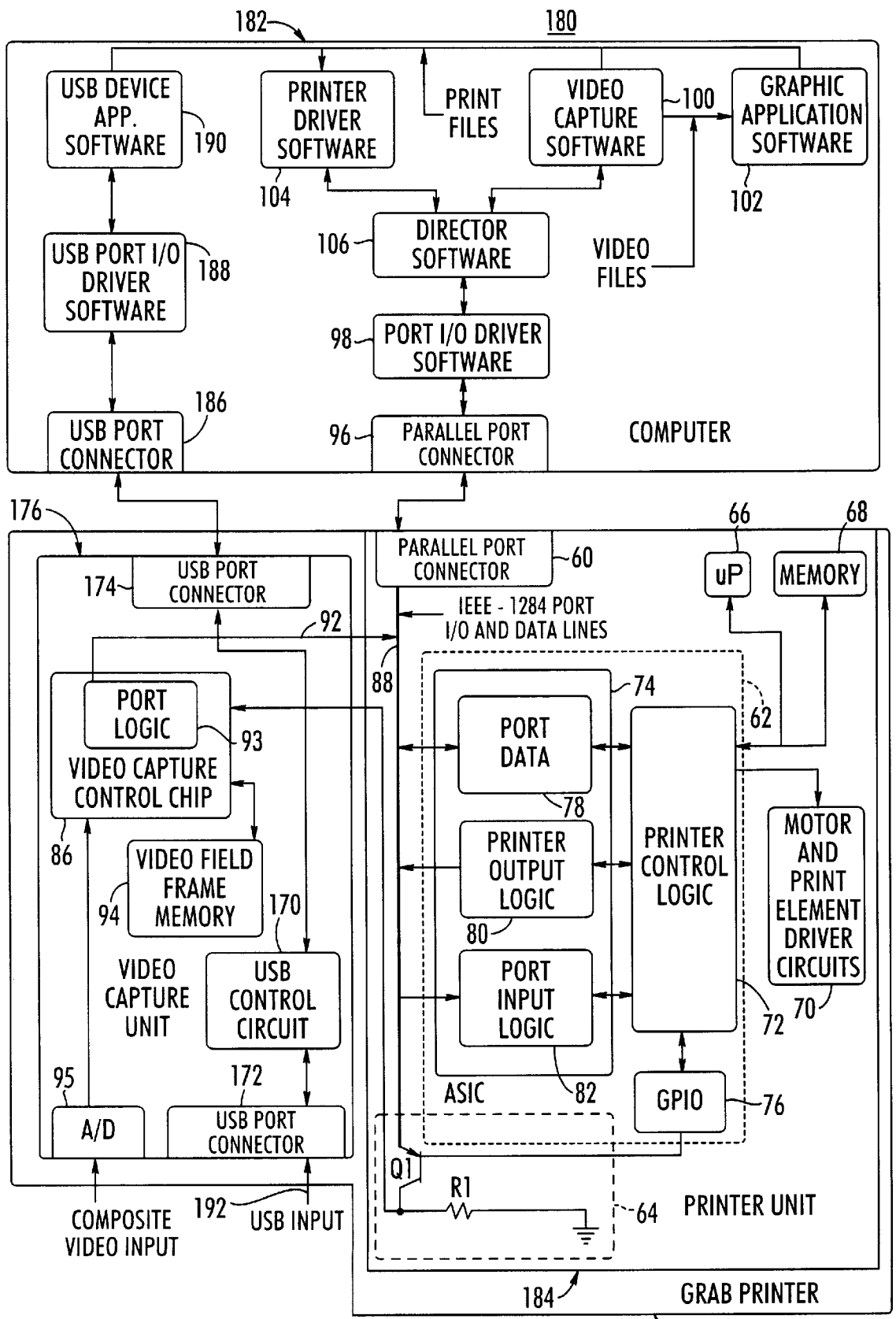
FIG. 5 is an additional block diagram showing a configuration of a frame imaging system incorporating the teachings of the present invention, and including Universal Serial Bus ("USB") data transfer capabilities.

Referring to FIG. 5, further extension of the holistic video frame capture/print approach of the present invention is described. Specifically, FIG. 5 shows a system 180 in which like parts to system 50 are similarly numbered and labeled. However, system 180 further include universal serial bus ("USB") control circuit 170, a USB input port 172, and a USB transfer port 174. An enhanced VCU 176, is part of a grab printer 178 of imaging system 180, which system also includes a computer 182. Grab printer 178 further includes a printer unit 184, which (like printer unit 58) includes microprocessor 66, memory 68, ASIC 62, and motor and print element driver circuits 70.

Similarly, computer 182, housed in its own cabinet separate from grab printer 178, is an enhanced version of computer 52 and includes USB components. Specifically, computer 182 includes a USB transfer port 186, USB port I/O driver software 188, and USB device application software 190.

The inclusion of USB components in computer 182 and VCU 176 of system 180 permits the system to provide high speed serial interface capability through grab printer 178 to computer 182 for USB-capable peripheral imaging devices. In fact, such capability makes possible the use of grab printer 178 with a "daisy chain" of USB-capable peripheral devices attached to each other for serial data transfer along the chain even from a peripheral-most device forward through to the device directly connected to port 172 of VCU 176.

This USB capability is important because, while many imaging devices provide composite video frame data outputs, some devices do not have such capability. For example, most image scanner and some digital cameras presently being made available in the marketplace provide USB (digital) outputs rather than composite (analog) video frame data outputs. In any event, providing both USB and composite video data capability in the computer and grab printer (VCU) of the imaging system creates an essentially universal imaging capability.

Referring, again, to FIG. 5, video data from a USB-capable device, e.g., a scanner, is provided to input port 172 over a line 192. Upon activation of USB device application software 190, computer 182 becomes operative to upload image data from the USB-capable device. More specifically, under control of software 190, the stored data is communicated through USB control chip 170, which controls the transfer of the already digitized video data through ports 174 and 186 for delivery to USB port I/O driver software 188, which prepares the data for storage and further processing by application software 190. The stored data then can be viewed on the display monitor (not shown) of computer 182.

Alternatively, the video data can be formatted as a print file and sent to printer driver software 104 and printed via port 96 operating in print mode. Instead, the video data could be sent from application software 190 to installed graphic application software 102 for other processing and then printed or viewed using the display monitor of computer 182.

In the presently shown preferred embodiment, printer unit 184 does not use the USB components to facilitate printing. Those components are used solely to allow convenient transfer of data from USB-capable imaging devices at the prompting of USB device application software 190. Even printing of USB video data is handled via parallel port 96 according to the port arbitration scheme described above for system 50. Accordingly, it should be observed that printing images of USB device origin will not be unduly impeded by the presence and use of the composite video data capabilities of VCU 176. Plainly, coordinated use of USB frame capture capabilities is unimpeded since USB video data transfer is through dedicated ports 174 and 186.

Whether in an embodiment including only composite video frame data capturing and printing capabilities, or also including USB video frame data capturing potential, the present invention provides a convenient, one-stop imaging system with coordinate functionality in capturing, processing and printing video frame data.

The present invention also comprises a method incorporating the foregoing teachings. This method is directed to a method for video frame imaging and printing with a grab printer having an integrated video capture unit, a printer unit and a grab printer port connector operatively connected to the video capture unit and the printer unit, and an arbitration control circuit. The method comprises the steps of: creating video frame data from a video input; providing control of the grab printer port connector to the video capture unit to make video frame data transferable between the integrated video capture unit and the grab printer port connector during a first mode of operation, and providing control of the grab printer port connector to the printer unit to make print image data transferable to the grab printer parallel port connector from a print image data input and between the grab printer port connector and the printer unit during a second mode of operation.

The present invention has been particularly shown and described with reference to a preferred embodiment, and with many statements indicating exemplary context. Thus, it should be understood by those skilled in the art that various changes in form and detail may be made without departing from the spirit and scope of the invention and all its incorporated teachings. The teachings here presented specifically are intended to cover any variations, uses, or adaptations of the invention using its general principles. Further it covers known or customary practice in the art to which this invention pertains and which fall within the appended claims.

To complement the aforementioned description of the present invention, computer programs are provided below for implementing image preview and printing functions. Specifically, the computer programs include video capture application software 100 (i.e., Windows Main Video Application Loop and Preview/Snap Operation) and printer driver software 104 (i.e., Windows Printer Driver Control Panel), both residing in computer 52. Additional software (i.e., Printer Firmware Main Command Decode Loop and Video Enable Command) residing in printer 54 is also included.

```
/******************************************/
/* WINDOWS MAIN VIDEO APPLICATION LOOP     */
/******************************************/
    .
    .
    .
                                        /* Display Main Video Screen :              */
    wDialogResp (clicked_button);       /*   get button clicked by user             */
        switch (clicked_button)         /* decode mode/function user selected       */
        {
            case PREVIEW:
                ProcessPreviewSnap (wPreview);   /* PREVIEW/SNAP OPERATION (preview)   */
                break;
            case SNAP:
                ProcessPreviewSnap (wSnap);      /* PREVIEW/SNAP OPERATION (snap)      */
                break;
            case ADJUST:
                ProcessAdjust ( . . . );         /* ENTER IMAGE ADJUST PROCESS         */
                break;
            case SAVE:
                ProcessSave ( . . . );           /* SAVE IMAGE                         */
                break;
            case PRINT:
                ProcessPrint ( . . . );          /* PRINT WORKING IMAGE                */
                break;
            case SETUP:
                ProcessSetup ( . . . );          /* PERFORM SETUP                      */
                break;
            case HELP:
                ProcessHelp ( . . . );           /* INVOKE ON-LINE HELP FUNCTION       */
                break;
        }
    .
    .
    .

/*****************************/
/* PREVIEW / SNAPP OPERATION  */
/*****************************/
    ProcessPreviewSnap (wType)
    {
                                        /* attempt to acquire printer port          */
        wresult = 1xRequestCommPriority ( lpszCommPort, wboundary, hWnd );
        if ( wresult == wBusyPrinting )
        {                               /* got port but printer busy printing       */
                                        /* display dialog box - Cancel or Wait      */
            DialogBox ( hInst, "IDD_CANCELWAITPRINTJOB", hwnd, DialogFunc03 );
            switch ( clicked_button )
            {
                case IDYES:             /* user clicked YES button                  */
                    /*********************************/
                    /* CANCEL PRINT JOB      */
                    /*********************************/
                    break;
                case IDWAIT:            /* user clicked WAIT button                 */
                    /*********************************/
                    /* WAIT FOR PRINT JOB TO FINISH    */
                    /*********************************/
                    break;
            }
        }
        InVideoMode = TRUE;
        if (wType == wSnap)
        {                                                       /* perform a snap           */
            /******************************************************/
            /* SEND VIDEO ENABLE COMMAND TO PRINTER    */
            /* NEGOTIATE REVERSE PRINTER CHANNEL       */
            /* ACQUIRE VIDEO SNAPSHOT      */
            /* DISPLAY CAPTURED VIDEO IMAGE WORK SCREEN    */
            /* TERMINATE REVERSE PRINTER CHANNEL       */
            /******************************************************/
        }
        if (wType == wPreview)
        {                                                       /* perform preview mode */
            /*********************************************/
            /* SEND VIDEO ENABLE COMMAND TO PRINTER    */
            /* NEGOTIATE REVERSE PRINTER CHANNEL       */
            /*********************************************/
            do
            {
                /*********************************************/
                /* ACQUIRE VIDEO MINI SNAPSHOT     */
                /* SHORT DELAY     */
```

```
                    /* DISPLAY CAPTURED MINI VIDEO IMAGE BOX    */
                    /************************************************/
                    wDialogResp (clicked_button);                       /* check for buttonclick   */
                while ( !clicked_button );
                    /************************************************/
                    /* TERMINATE REVERSE PRINTER CHANNEL    */
                    /************************************************/
            }
        return;
        }
/************************************************/
/* WINDOWS PRINTER DRIVER CONTROL PANEL    */
/************************************************/
                .
                .
                .
        if ( PrintReq )                        /* check if we have a print request            */
        {                                      /* attempt to acquire printer port             */
            wresult = 1xRequestCommPriority ( lpszCommPort, wBoundary, hWnd );
            if ( wresult == wHaveport)
                {                              /* we succeeded in acquiring port              */
                /******************/
                /* START PRINT JOB    */
                /******************/
                                               /* release printer port                        */
                wresult = 1xRelesecommPriority ( lpszCommPort, hWnd );
            }
            else
                {                              /* failed in acquiring port                    */
                                               /* display dialog box                          */
                DialogBox ( hInst, "IDD_CANCELPRT", hwnd, DialogFunc05 );
                if ( message == IDYES )
                    {                          /*user clicked YES button                      */
                    /******************/
                    /* FLUSH PRINT JOB    */
                    /******************/
                    }
                }
        }
                .
                .
                .
/**********************************************************/
/* PRINTER FIRMWARE MAIN COMMAND DECODE LOOP    */
/**********************************************************/
        while (1)
        {
            RecPrtCmd ( sPrtCmd );             /* Receive buffered printer command            */
                                               /*   across printer port                       */
            if ( sPrtCmd [1:5] == NPACMD)      /* check for NPA command packet                */
                .                              /*****************************/
                .                              /* Decoded NPA command packet    */
                .                              /*****************************/
            else
                if ( sPrtCmd [1:2] == ESCASTCMD)    /* check for ESC * command                */
                {
                    switch (EACMDSUB1)         /* decode ESC * commands                       */
                    {
                        case 0x03:             /* forms movement                              */
                            .
                            .
                            .
                        case 0x04:             /* print                                       */
                            .
                            .
                            .
                        case 0x6D:             /* base commands                               */
                            switch (EAMSUB2)   /* decode ESC * m commands                     */
                            {
                                case 0x00:     /* carrier movement                            */
                                    .
                                    .
                                    .
                                case 0x01:     /* carrier maintenance                         */
                                    .
                                    .
                                    .
                                case 0x34:     /* video enable                                */
                                    /*********************/
                                    /* VIDEO ENABLE COMMAND    */
```

-continued

```
                        /***********************/
                case 0x50:        /* send printer parameters       */
                        .
                        .
                        .
                }
            case 0x08:             /* start print job              */
                    .
                    .
                    .
            }
        }
    }
}
/******************************************/
/* VIDEO ENABLE COMMAND    */
/*                         */
/*  ESC   *   m   00 34    */
/*  IB    2A  6D  00 34    */
/*                         */
/******************************************/
    case 0x34: /* Video Command */
        {
            while ( mech_busy () == BUSY
            {
                SLEEP ();
            }
            int_ms &= 0xFE;              /* Disable all interrupts */
            work1 = ppcr;                /* Save parallel port control reg. */
            ppcr |= 0x1013;              /* Set the 245 Direction Bit high & control */
                                         /*   outputs high */
            if ( bVideoStart == 0xFF )
            {
                wVideoTimer = 5000;      /* 10 second delay */
            }
            else if ( bVideoStart == 0x00 )
            {
                wVideoTimer = 1;
            }
            else
            {
                wVideoTimer = bVideoStart;  /* bVideoStart is in 2 msec Increments */
            }
            while ( !(pp_io & 0x0008) && (wVideoTimer != 0) ) /* Wait for Select in to go    */
                                                              /*   High                      */
            {
                DELAY (2000);            /* delay 2 mSEC */
                wVideoTimer--;
            }
            wVideoTimer = 1;
            while ( wVideoTimer )        /* Wait for Select in to go low */
            {
                if (!(pp_io & 0x0008) )  /* Check for select in low */
                {
                                         /* Delay and check again, Debounce */
                    for ( wVideoTimer = 1; wVideoTimer <= bVideoend; wVideoTimer++)
                    {
                        Delay ( 2000) ;
                    }
                    if (!(pp_io & 0x0008) )
                    {
                        wVideoTimer = 0;  /* Stop checking and get out */
                    }
                }
            }
            ppcr = work1;                /* Restore ppcr register */
            int_ms |= 0x01;
            break;
        }
```

What is claimed is:

1. A printer comprising:

a composite video input port;

a parallel port;

a video capture circuit coupled between said composite input port and said parallel port;

a print element driver circuit; and a printer control logic circuit coupled between said print element driver circuit and said parallel port.

2. A printer comprising:

a universal serial bus import; (30)

a universal serial bus transfer port; (28, 24)

a universal serial bus control circuit (38) coupled between said universal serial bus input port (30) and said universal serial bus transfer port (28, 24);

a parallel port; (22)

a print element driver circuit; (48)

a printer control logic circuit (44) coupled between said print element driver circuit 48 and said parallel port (22).

3. A printer of claim 1 including:

a selection circuit connected between said video capture circuit and said printer control circuit.

4. A printer of claim 2 including:

a composite video input port;

a video capture circuit coupled between said composite input port and said parallel port; and a selection circuit connected between said video capture circuit and said printer control circuit.

5. A printer of claim 3 or 4, wherein said selection circuit includes a switch having a control input coupled to receive a control signal from said printer control circuit and an output coupled to selectively connect said parallel port to said video capture circuit.

6. A printer of claim 5, including a port input logic circuit coupled between at least one data line and said printer logic circuit to permit said printer logic circuit to sense the state of said at least one data line.

7. A printer of claim 1 including means for selectively enabling one or the other of said video capture circuit and said printer control logic circuit.

8. A system comprising the combination of:

a printer as provided by one of claims 1, 3, 4 or 7; and a computer including:

a parallel port of said computer connected to said parallel port of said printer;

printer driver software;

video capture software; and director software to arbitrate connection of data between said parallel port of said computer and said printer driver software and said parallel port of said computer and said video capture software.

9. An imaging system for processing imaging data, including video frame data, and for printing images corresponding to print image data, comprising:

a computer having software for receiving and processing video frame data and for generating print image data and having a computer port;

a selection circuit; and a grab printer including an integrated video capture unit for creating video frame data from a video input, a printer unit for printing images corresponding to print image data, and a grab printer port, wherein the computer port and the grab printer port are coupled to transfer video frame data created by the video capture unit between the video capture unit and the computer for processing by the computer when said selection circuit is in a first operating state; and wherein the computer port and the grab printer port are coupled to transfer print image data between the computer and the printer unit for printing images using the printer unit when said selection circuit is in a second operating state.

10. A grab printer for creating video frame data and for printing images corresponding to print image data, comprising:

an integrated video capture unit for creating video frame data from a video input;

a printer unit for printing images corresponding to print image data;

a grab printer port operatively connected to the integrated video capture unit and the printer unit; and a selection circuit, wherein the selection circuit, in a first operating state, facilitates transfer of video frame data between the grab printer port and the integrated video capture unit; and wherein the selection circuit, in a second operating state, facilitates transfer of print image data between the grab printer port and the printer unit.

11. An imaging system for processing imaging data, including video frame data, and for printing images corresponding to print image data, comprising:

a computer having software for receiving and processing video frame data and for generating print image data and having a first computer port and a second computer port;

a selection circuit; and a grab printer with an integrated video capture unit for creating video frame data from a video input and receiving image data in universal serial bus form, a printer unit for printing images corresponding to print image data, and a first grab printer port and a second grab printer port, wherein the first computer port and the first grab printer port are coupled together to transfer video frame data created by the video capture unit between the video capture unit and the computer for processing by the computer when said selection circuit is in a first operating state;

wherein the first computer port and the first grab printer port are coupled to transfer print image data between the computer and the printer unit for printing images using the printer unit when the selection circuit is in a second operating state; and wherein the second computer port and the second grab printer port are coupled together to transfer image data in universal serial bus form between the integrated video capture unit and the computer for processing by the computer.

12. A grab printer for receiving and generating image data, including by creating video frame data, and for printing images corresponding to print image data, comprising:

an integrated video capture unit for receiving image data in universal serial bus form, and for creating video frame data from a video input;

a printer unit for printing images corresponding to print image data;

a first grab printer port operatively connected to the integrated video capture unit and the printer unit;

a selection circuit; and a second grab printer port operatively connected to the integrated video capture unit, wherein the first grab printer port is responsive to the selection circuit to make video frame data transferable between the first grab printer port and the integrated video capture unit during a first mode of operation, wherein the first grab printer port is responsive to the selection circuit to make print image data transferable between the first grab printer port and the printer unit during a second mode of operation, and wherein the image data in universal serial form is transferable between the integrated video capture unit and the second grab printer port.

13. The imaging system of claim 9, wherein the printer is responsive to port data from the computer, received when said selection circuit is in the first operating state, to place the selection circuit in the second operating state.

14. The grab printer of claim 10, wherein the printer unit is responsive to port data, received when said selection circuit is in the first operating state, to place the selection circuit in the second operating state.

15. A method for imaging, including for video frame imaging, and printing with using a grab printer having an integrated video capture unit, a printer unit and a grab printer port operatively connected to the video capture unit and the printer unit, and an arbitration control circuit, comprising the steps of:

creating video frame data from a video input;

providing control of the grab printer port to the video capture unit to make video frame data transferable between the integrated video capture unit and the grab printer port during a first mode of operation; and providing control of the grab printer port to the printer unit to make print image data transferable to the grab printer parallel port from a print image data input and between the grab printer port and the printer unit during a second mode of operation.

16. The method of claim 15 wherein the step of creating video frame data from a video input comprises creating the video frame data from composite video data input.

17. A method for imaging, including for video frame imaging, and printing using a grab printer having an integrated video capture unit, a printer unit, a first grab printer port operatively connected to the video capture unit and the printer unit, an arbitration control circuit, and a second grab printer port comprising the steps of:

creating video frame data from a video input;

providing control of the first grab printer port to the video capture unit to make video frame data transferable between the integrated video capture unit and the first grab printer port during a first mode of operation;

providing control of the first grab printer port to the printer unit to make print image data transferable to the first grab printer parallel port from a print image data input and between the first grab printer port and the printer unit during a second mode of operation; and transferring data in universal serial form between the integrated video capture unit and the second grab printer port.

18. The method of claim 15 further including the step of providing port data to the printer unit during the first mode of operation to enable the printer unit to obtain control of the grab printer port connector during the second mode of operation.

* * * * *

UNITED STATES PATENT AND TRADEMARK OFFICE
CERTIFICATE OF CORRECTION

PATENT NO : 5,970,220
DATED : October 19, 1999
INVENTOR(S) : John Philip Bolash, Thomas Jon Eade, Michael David Gonzalez-Rubio, and Matthew Kevan Zimmer It is certified that error appears in the above-identified patent and that said Letters Patent are hereby corrected as shown below:

Col. 18, line 63, replace "import; (30)" with -- input port; --.

Col. 18, line 64, delete "(28, 24)".

Col. 18, line 65, delete "(38)".

Col. 18, line 66, delete "(30)".

Col. 18, line 67, delete "(28,24)".

Col. 19, line 1, delete "(22)".

Col. 19, line 2, delete "(48)".

Col. 19, line 3, delete "(44)".

Col. 19, line 4, delete "48".

Col. 19, line 5, delete "(22)".

Signed and Sealed this

Third Day of April, 2001

*Attest:*

NICHOLAS P. GODICI

*Attesting Officer*         Acting Director of the United States Patent and Trademark Office